3,647,718
Patented Mar. 7, 1972

3,647,718
MICROSPHERICAL ZEOLITIC MOLECULAR SIEVE COMPOSITE CATALYST AND PREPARATION THEREOF

Walter L. Haden, Jr., Metuchen, and Frank J. Dzierzanowski, Somerset, N.J., assignors to Engelhard Minerals & Chemicals Corporation, Township of Woodbridge, N.J.
No Drawing. Continuation-in-part of application Ser. No. 738,384, June 20, 1968. This application Mar. 25, 1969, Ser. No. 810,325
Int. Cl. B01j *11/40;* C01b *33/28*
U.S. Cl. 252—455 Z                                    8 Claims

ABSTRACT OF THE DISCLOSURE

A fluid zeolitic molecular sieve composite catalyst is prepared by reacting a mixture of two different forms of calcined kaolin clays in an aqueous alkaline reaction liquid, the two different forms of calcined kaolin clay being present in separate preformed microspheres which retain substantially their size and form throughout the reaction. Silica is extracted from the microspheres during reaction. The reacted microspheres are separated from the mother liquid and then they are ion exchanged.

RELATED APPLICATIONS

This application is a continuation-in-part of our copending application, Ser. No. 738,384, filed June 20, 1968, now U.S. 3,506,594.

BACKGROUND OF THE INVENTION

It is known that finely divided calcined kaolin clay which has undergone the characteristic kaolin exotherm during calcination may be reacted with sodium hydroxide solution to synthesize crystalline faujasite-type zeolites (zeolite X and zeolite Y). The fine calcined clay is slurried in a caustic solution of suitable composition and the slurry is aged and subjected to hydrothermal treatment without dehydration. A solid or semisolid mass containing an appreciable amount of the synthetic crystalline zeolitic molecular sieve may be obtained. Reference is made to our U.S. Pat. No. 3,391,994 issued July 9, 1968. It is also known that a larger quantity of the synthetic faujasite zeolite may frequently be crystallized and the adverse effect of possible overcalcination of the clay may be avoided when the clay that undergoes the exothermic reaction during calcination is present in the reaction mixture with kaolin clay that has been calcined at a lower temperature, i.e., metakaolin. Reference is made to our U.S. Pat. No. 3,338,672, issued Aug. 29, 1967.

The resulting zeolitic molecular sieve products may be ion-exchanged, pulverized and composited with a suitable diluent or matrix material to obtain compositions that possess desirable characteristics for use as cracking catalysts to produce gasoline. However, in order to be useful in commercial cracking units, the zeolitic material must be supplied in the form of particles of desired size and form. It is essential that these particles possess adequate hardness (attrition-resistance) for use in cracking catalyst unit.

In fluid cracking operations the catalyst particles are preferably in the form of very small spheres or microspheres, e.g., particles in the range of 20 to 150 microns. Great difficulties have been experienced in past attempts to prepare hard fluid zeolitic molecular sieve composite catalysts by binding previously formed powdered molecular sieve crystals.

It has also been suggested to form zeolitic molecular sieve bodies directly in the desired size and shape by impregnating or immersing preformed alumina-silica bodies in a suitable aqueous alkaline reaction liquid and causing reaction and crystallization to take place. Difficulty has been experienced in past attempts to prepare fluid zeolitic molecular sieve composite catalyst particles of adequate hardness by this general technique when using calcined clay as a constituent of the preformed bodies. In some cases the preformed bodies disintegrated during reaction or crystallization and microspheres were therefore not obtained. In carrying out other experiments the products were obtained in the form of microspheres but the microspheres were either too soft initially or became excessively soft after they had been subjected to attritive forces.

Still another problem encountered in past attmpts to obtain zeolitic molecular sieve composite catalysts in the form of fluid-size microspheres by immersing preformed bodies in an aqueous reaction liquid was that of crystallizing the desired zeolitic molecular sieve in the product and obtaining a sufficient quantity of the desired zeolite. This technique frequently favored the crystallization of small pore diameter zeolitic molecular sieves such as types A and B. See U.S. 3,366,578 to Michalko. When zeolitic molecular sieves having larger pore diameters were crystalized they frequently were obtained as mixtures with the small pore diameter zeolites which do not possess the catalytic cracking properties of the faujasite zeolites. Especial difficulty was experienced in synthesizing an adequate amount of zeolite Y, especially a high $SiO_2/Al_2O_3$ form of zeolite Y, which is a form of faujasite that produces catalysts of outstanding stability and cracking properties.

THE INVENTION

An object of this invention is to provide a novel method for making a fluid zeolitic molecular sieve composite catalyst by reacting preformed alumina-silica microspheres in an aqueous alkaline reaction liquid.

A specific object is to provide a simple inexpensive method for making a fluid composite catalyst containing zeolite Y as the sole or principal crystalline zeolitic molecular sieve constituent.

A general object is to carry out the reaction between sodium hydroxide solution and preformed microspheres containing calcined kaolin clay in a manner such that the desired crystalline faujasite zeolite product, preferably a high $SiO_2/Al_2O_3$ form of zeolite Y, is obtained as a composite with an amorphous alumina-silica material in the form of attrition-resistant microspheres.

Briefly stated, in accordance with the present invention a composite zeolitic molecular sieve catalyst in the form of attrition-resistant microspheres is prepared by reacting a mixture of metakaolin and calcined kaolin clay that has undergone the characteristic kaolin exotherm with an aqueous alkaline reaction liquid, the metakaolin being present in preformed calcined amorphous alumina-silica microspheres free from hydrated kaolin clay and the clay that has undergone the exotherm being present in separate preformed calcined alumina-silica microspheres that are also free from hydrated kaolin clay. The ingredients are reacted while under agitation and they are crystallized at elevated temperature, the crystallization being terminated before zeolite B forms to an appreciable extent and the quantity of crystalline faujasite that is present decreases. The zeolitic microspheres are then separated from the mother liquid.

The crystalline microspheres are ion-exchanged to replace sodium ions with suitable cations, the selection of which is within the skill of the art. Prior to use or during use, the ion-exchanged microspheres are thermally activated.

It is also essential to terminate the hydrothermal treatment after substantially the maximum amount of synthetic faujasite crystallizes. If hydrothermal treatment is continued substantially beyond such time, zeolite B will begin to crystallize. Simultaneously the quantity of faujasite will decrease, the faujasite apparently reacting with the aqueous liquid to form zeolite B. Eventually all of the crystalline material in the microspheres will be sodium zeolite B and the ultimate product will not possess the desired ability to crack gas-oil feedstocks.

In spite of the fact that the product is obtained from a heterogeneous mixture of microspheres, it may be obtained virtually free from undesirable mixtures of zeolites. This result was generally contrary to expectations. It would have been reasonable to anticipate that the microspheres composed of metakaolin would react with the aqueous alkaline liquid to form zeolite A or possibly, no zeolite, while the other microspheres would be expected to produce faujasite or no zeolite if they had been overcalcined.

In a preferred embodiment of the invention, the mixture of preformed microspheres is obtained by slurrying uncalcined (hydrated) kaolin clay in water, spray drying the slurry into hot air to form microspheres. One portion of the mixture is calcined under conditions of temperature and time such that metakaolin is formed and another portion of the same or similar batch of microspheres is calcined under conditions of temperature and time such that the kaolin clay undergoes or passes through the characteristic kaolin exotherm.

In a variation of this embodiment of the invention, the mixture of microspheres is obtained by slurrying a mixture of finely divided uncalcined kaolin and finely divided amorphous calcined kaolin clay, spray drying so as to form microspheres and then calcining portions of the microspheres under different conditions as described above.

A full appreciation of the difficulties overcome by the practice of the principles of this invention necessitates a comparison of the results realized when the two different forms of calcined clay are included in separate microspheres (the present invention) with the results that would be obtained if both forms of calcined clay were included in all of the microspheres. The latter practice will not result in the provision of a product containing the desired zeolite if the preformed bodies are obtained from a starting slurry containing sufficient hydrated clay to form calcined microspheres of desired hardness. Thus, when a slurry containing calcined clay that has undergone the exotherm also includes sufficient hydrated clay to form hard microspheres and the slurry is spray dried and calcined under conditions to convert the hydrated clay to metakaolin, the ratio of metakaolin to clay that has undergone the exotherm will be too high to form a zeolitic molecular sieve having a $SiO_2/Al_2O_3$ mole ratio in excess of 3. If less hydrated clay is included in the slurry, a desired high $SiO_2/Al_2O_3$ form of faujasite may be obtained but the product will be too soft and friable. On the other hand, mixtures of metakaolin and calcined kaolin that have undergone the exotherm cannot be obtained free from hydrated kaolin in single calcined microspheres by spray drying aqueous slurries containing only hydrated kaolin clay. If the calcination of the microspheres is carried out under conditions of temperature and time to produce metakaolin, clay that has passed through the exotherm is not present and faujasite-type zeolite is not crystallized. If calcination is carried out under conditions to obtain kaolin that has undergone the exotherm, any metakaolin originally present or produced as an intermediate is no longer present.

DETAILED DESCRIPTION

(A) Preparation of the mixture of calcined microspheres

The starting materials employed in producing these microspheres is a micron-size (powdered) clay material selected from the group consisting of hydrated kaolin clay and mixtures of hydrated kaolin clay and calcined amorphous kaolin clay.

Low-iron, high purity hydrated and calcined clays are preferred.

The use of a fine size plastic hydrated kaolin clay, i.e., a clay containing a substantial quantity of submicron size particles, is preferred since the use of such clay generally contributes to the provision of catalysts of superior attrition-resistance.

The term "kaolin clay" as used herein embraces clays, the predominating mineral constituent of which is kaolinite, halloysite, nacrite, dickite, anauxite and mixtures thereof.

The powdered calcined clay may be obtained by calcining pulverized high purity, low iron kaolin clay at a product temperature within the range of about 1000° F. to 2200° F., preferably 1350° F. to 1850° F. Mixtures of clays calcined at temperatures within these ranges may be employed. When calcining clay at elevated temperature, e.g., temperature appreciably above 1800° F. or 1900° F., the duration of the calcination should be limited to avoid the formation of new crystalline phases. The calcined clay should be amorphous when tested by standard X-ray diffraction although diffraction maxima characteristic of crystalline impurities such as anataste may be present. In other words, the calcined clay should produce an X-ray diffraction pattern free from strong peaks characteristic of high temperature alumina, silica or aluminum silicate crystalline phases.

Suggested proportions are from 0 to 100 parts by weight powdered calcined kaolin clay (moisture-free basis) to 100 parts by weight of powdered hydrated kaolin.

To facilitate spray drying, the powdered hydrated clay (or mixture thereof with calcined clay) is preferably dispersed in water in the presence of a deflocculating agent exemplified by sodium silicate or a sodium condensed phosphate salt such as tetrasodium pyrophosphate. By employing a deflocculating agent, spray drying may be carried out at higher solids levels and harder products are usually obtained. When a deflocculating agent is employed, slurries containing about 55% to 60% solids may be prepared and these high solids slurries are preferred to the 40% to 50% slurries which do not contain a deflocculating agent. Higher solids slurry may also be prepared when all of the clay is in hydrated (uncalcined) condition. Thus, the use of hydrated kaolin clay as the sole clay material in combination with the use of a deflocculating agent is especially preferred.

Other ingredients such as, for example, combustible fillers, may also be present in the slurry.

Several procedures can be followed in mixing the ingredients to form the slurry. One procedure, by way of example, is to dry blend the finely divided solids, add the water and then incorporate the deflocculating agent. The components can be mechanically worked together or individually to produce slurries of desired viscosity characteristics.

Spray dryers with countercurrent, cocurrent or mixed countercurrent and cocurrent flow of slurry and hot air can be employed to produce the microspheres. The air may be heated electrically or by other indirect means. Combustion gases obtained by burning hydrocarbon fuel in air can be used.

Spray drying results in the evaporation of water from droplets of the slurry and the formation of microspheres. Microspheres about 20 to 150 microns in equivalent spherical diameter are desired for most catalytic operations using fluidized contact masses.

Using a cocurrent dryer, air inlet temperatures to 1200° F. may be used when the clay feed is charged at a rate sufficient to produce an air outlet temperature within the range of 250° F. to 600° F. At these temperatures, free moisture is removed from the slurry without removing water of hydration (water of crystallization) from the raw clay ingredient. Dehydration of some or all of the raw clay during spray drying is, however, within the scope of the invention. The spray dryer discharge may be fractionated to recover microspheres of desired particle size.

(B) Preparation of the mixture of calcined microspheres

One portion of the spray dryer discharge may be calcined at a temperature within the range of about 1600° F. to about 2200° F. and for a time such that when the calcined microspheres are tested by standard differential thermal analysis (DTA) they do not exhibit a substantial exothermic peak at about 1800° F. In other words, this portion of the microspheres is calcined under conditions such that any clay which has not undergone the kaolin exotherm before use undergoes or passes through the exotherm after the microspheres have been formed. The kaolin endotherm and exotherm can be readily determined by differential thermal analysis (DTA), using the technique described in Ralph E. Grim's "Clay Mineralogy," page 203, published by McGraw Hill Book Company, Inc. (1952). The other portion of the spray dryer discharged may be calcined (thermally dehydrated) at a temperature within the range of about 1000° F. to 1500° F., usually about 1350° F., for a time sufficient to remove water and convert any hydrated kaolin to metakaolin. The two batches of microspheres may then be combined in appropriate proportions, described below, and the mixture employed with a suitable caustic solution to form the zeolitic molecular sieve composite.

Alternatively, the calcined microspheres may be obtained from different slurries of clay material. For example, the metakaolin-containing microspheres may be obtained by spray drying a slurry containing raw (hydrated) kaolin and metakaolin and calcining the microspheres at 1350° F. for 2 hours. These microspheres may then be employed, by way of example, with microspheres obtained by spray drying a deflocculated slip consisting of hydrated clay as the sole clay material, calcining the resulting microspheres at about 1900° F. for 2 hours or under other conditions of temperature and time that cause all of the hydrated kaoline to undergo or pass through the exotherm. Similar microspheres are obtained by employing such calcination conditions with spray dried microspheres consisting essentially of hydrated kaolin, metakaolin, and calcined kaolin that has passed through or has undergone the exotherm or a mixture of metakaolin with calcined kaolin that has passed through or undergone the exotherm. When using these mixtures, sufficient hydrated kaolin clay, preferably at least 50% by weight of the clay mixture, should be used to obtain a hard product.

As still another possibility, the microspheres containing metakaolin may be obtained by spray drying an aqueous slurry containing metakaolin and a major amount, e.g., at least 50% by weight hydrated kaolin clay, and calcining these microspheres at 700° F. to 1500° F. Another portion of the same spray dryer discharge product could be calcined at about 1900° F.

It is not essential that the microspheres composed predominantly of metakaolin be free of clay calcined under more severe temperatures. Thus, the mixture of microspheres may be obtained by spray drying a mixture of hydrated kaolin clay, metakaolin and kaolin that has undergone or passed through the exotherm, the hydrated clay being present in major proportion. A portion of the microspheres is calcined under conditions selected to convert the hydrated clay to metakaolin, thereby forming a mixture composed of a major proportion of metakaolin mixed with amorphous calcined clay that has undergone or passed through the exotherm. The other portion of the spray dried microspheres is calcined under conditions that cause both the hydrated clay and metakaolin to undergo the exotherm. The two portions of calcined microspheres are included in the reaction mixture. This embodiment of the invention is described in an illustrative example.

The calcined microspheres are employed in relative proportions to provide from about 1 to 50 parts by weight metakaolin to 100 parts by weight of calcined kaolin that has undergone or passed through the exotherm. A low ratio of metakaolin to calcined kaolin clay that has undergone the exotherm favors the crystallization of zeolite Y. Zeolite X is obtained as the ratio is increased. When too much metakaolin is present, the desired crystalline product may not be obtained even when the hydrothermal treatment is carried out for long periods of time, e.g., 48 hours or more. On the other hand, when too little metakaolin is present in the reaction liquid, the quantity of zeolite that crystallizes may be less than desired. This is especially true if the calcined clay in the other microspheres has passed through the characteristic kaolin exotherm.

(C) Formation of aqueous reaction mixtures

The microspheres are reacted with an aqueous alkaline liquid in which they are suspended, the liquid having a composition predetermined to result in the crystallization of a desired percentage of faujasite zeolite molecular sieve. Only a portion of the constituents of the calcined microspheres reacts to form the zeolitic molecular sieve and thus a composite of crystalline sieve and an amorphous alumina-silica residue is present in the crystallized microspheres. Generally speaking, after crystallization the microspheres should contain above 15% crystalline faujasite-type zeolite, most preferably above 20% zeolite. The term "faujasite-type zeolite" embraces zeolite X and zeolite Y. Preferably, a high silica form of sodium Y is crystallized, especially sodium zeolite Y having a $SiO_2/Al_2O_3$ molar ratio in excess of 4.0. X-ray diffraction techniques that may be used to estimate zeolite quantity, distinguish zeolite X from zeolite Y, and determine the silica-to-alumina molar ratios of zeolite Y appear in Ser. No. 738,384 (supra).

The aqueous alkaline solution must be employed in amount that forms a suspension which is sufficiently fluid to be stirred and also contains sufficient $Na_2O$ at an operable concentration to crystallize the desired faujasite zeolite. Recommended is the use of sufficient solution to provide from about 0.5 to 1.0 mole $Na_2O$ per mole $Al_2O_3$ in the mixture of calcined micropheres. Sodium hydroxide solutions of about 10% to 22% concentration (w./w.) are recommended. Solutions of 14% to 19% concentration are preferred. When the concentration of $Na_2O$ in the treating liquid is too low, the zeolite may not crystallize. When the concentration is too high, there may be insufficient liquid to produce a fluid suspension without employing a $Na_2O/Al_2O_3$ molar ratio that is excessively high and results in a zeolite having an undesirably low $SiO_2/Al_2O_3$ molar ratio.

It is also within the scope of the invention to employ an aqueous solution containing silicate ions as well as sodium ions and hydroxyl ions. The silicate ions may be incorporated with the sodium hydroxide solutions before the micropheres are added or they may be introduced during reaction or crystallization.

The microspheres are reacted with the sodium hydroxide solution in which they are immersed while the suspension is agitated and maintained at a temperature within the range of about 65° F. to about 130° F. for a time within the range of about 6 to 48 hours. Crystallization does not take place during this phase of the hydrothermal treatment. Excellent results have been obtained at a temperature of 100° F. for 24 hours.

To crystallize the zeolite, the temperature of the suspension is increased to about 150° F. to 200° F. During the crystallization, means should be provided to prevent substantial change in water content due to loss of water from the system. This may be done, for example, by using a closed reactor, by providing the reactor with a water-cooled jacket to condense water which evaporates, or, when operating in an open reactor, by adding water as it is lost from the reactor by evaporation. It is also within the scope of the invention to employ an open reactor and cover the aqueous suspension with oil. In this case, the impeller used to agitate the system should be well below the oil layer in order to maintain the oil as a distinct upper layer.

Crystallization time varies with the composition of the reaction mixture and temperature and is usually within the range of 8 to 48 hours at a temperature of about 180° F.

As described in Example I, a substantial portion of the silica content of the calcined microspheres dissolves in the caustic reaction liquid during the hydrothermal treatment. As a result, the crystallized microspheres are present in a sodium silicate mother liquor.

After reaction and crystallization, the micropheres are separated from the mother liquid by suitable means such as filtration. The microspheres are optionally washed with water and sodium in the zeolite is exchanged for more suitable cations such as, for example, ammonium, magnesium, calcium, rare earth metals or mixtures thereof. The exchanged microspheres are dried and then activated by air calcination, steaming or both.

All X-ray diffraction data mentioned herein refer to values obtained by the procedure and with the equipment described in U.S. 3,391,994 (supra). The percentage of zeolite Y refers to values obtained from X-ray diffraction data using calculations described in said patent. The crystalline zeolite referred to as "zeolite B" was identified by a peak of maximum intensity at 28.2° $2\theta$. Because a reference sample of zeolite B was not available for comparison, the relative portion of zeolite B present was estimated from the intensity of the 27.1° $2\theta$ peak for a reference sample of zeolite Y (assumed to be 100% zeolite Y). Zeolite B is described in U.S. 3,008,803. According to some authorities, this zeolite is the same as the zeolite known as "Na-P." (See an article by A. M. Taylor et al., "Zeolite Studies IV," The American Mineralogist, vol. 49, May-June 1964, pp. 656 to 682.)

EXAMPLE I

A fluid zeolite molecular sieve catalyst was produced, in accordance with this invention, by the following procedure.

In accordance with this invention, 378 parts by weight of "Hydrite UF" was blended with 126 parts by weight of "Satintone #1," 27 parts by weight of "Satintone #2," 28.0 parts by weight of "N"® sodium silicate solution and 436 parts by weight distilled water. "Satintone #2" is a commercial metakaolin pigment obtained by thermally dehydrating high purity kaolin clay under conditions such that the clay undergoes an endothermic reaction associated with the loss of chemically held water but does not pass through the kaolin exotherm. "Satintone #1" is also a commercial calcined clay pigment and is produced by calcination at higher temperature than is used to prepare metakaolin; this clay material passes through the exotherm during the calcination treatment. Typical properties of the calcined clay pigments are reported in U.S. 3,338,672. "Hydrite UF" is a fine size fraction of water-washed, low iron hydrated kaolin clay. "N"® sodium silicate solution contains 38% solids and has a $Na_2O/SiO_2$ weight ratio of 1:3.2.

The ingredients were thoroughly mixed with a "Lightnin' Mixer," producing a fluid slip containing 56% solids and having a density of 1.5 kg./l.

The slip was spray dried in a 5 x 5 ft. gas-fired spray dryer using an atomizer wheel speed of 15,760 r.p.m. Air inlet and outlet temperatures were approximately 1100° F. and 450° F., respectively.

A 10 lb. sample of the spray dried microspheres was screened and a minus 60 mesh (Tyler) fraction was recovered.

Mechanically strong, porous microspheres consisting largely of calcined kaolin clay that had undergone the characteristic kaolin exotherm were prepared by placing one portion of the screened microspheres in a silica tray and maintaining the tray in a muffle furnace for 2 hours at 1800° F. The resulting calcined micropheres were essentially free from metakaolin and hydrated kaolin clay. Another portion of the screened uncalcined microspheres was placed in another silica tray and calcined in a muffle furnace for 2 hours at 1350° F. to provide microspheres estimated to contain about 80% metakaolin. These microspheres were also free from hydrated kaolin clay. The batches of calcined microspheres were cooled and blended in proportion of 15.0 g. microspheres calcined at 1350° F. and 135.0 g. microspheres calcined at 1800° F.

The mixture of calcined microspheres was gradually charged to a 500 ml. round bottom glass flask containing 220.2 ml. of a 14% (w./w.) solution of sodium hydroxide while the solution was being agitated. The proportion of sodium hydroxide solution employed was equivalent to 0.67 mole $Na_2O$ per mole $Al_2O_3$ in the microspheres. It was estimated that the proportion of metakaolin to kaolin that passed through the exotherm was about 1:13 (weight basis).

The flask was fitted with a thermometer and a water-cooled condenser through which an agitator extended with the impeller near the base of the flask. The fluid mixture was maintained at 100° F. ±20° F. for 24 hours while the agitator was in operation. After 22 hours of mixing at 100° F., the temperature was raised to 180° F. and maintained at that temperature while agitation was continued. Samples were periodically removed from the flask with a pipette. The samples were filtered in Buchner funnels and washed with distilled water, dried and analyzed for composition by means of X-ray diffraction.

After being held at about 180° F., the hydrothermal treatment was discontinued and the microspheres were separated from the mother liquid by filtration. A sample of the microspheres was examined by X-ray diffraction and found to contain 28% sodium zeolite Y having a $SiO_2/Al_2O_3$ mole ratio of 4.36. From analyses of the chemical composition of the mother liquor and that of the reactants, the $SiO_2/Al_2O_3$ molar ratio of the composite microspheres was calculated to be 1.3:1. Since the $SiO_2/Al_2O_3$ molar ratio of the preforms was 2/1, it was obvious that substantial quantities of silica had been extracted from the microspheres during the reaction.

To convert the microspheres to an active cracking catalyst, the sodium in the mircrospheres were exchanged for the ammonium ion by percolating 890 ml. of 2 N $NH_4NO_3$ solution through the microspheres in a chromatography column. The ion-exchanged microspheres were washed with two 100 ml. portions of distilled water. After washing, the microspheres were dried at room temperature under vacuum.

A sample of 100–270 mesh (Tyler) microspheres that had been ion-exchanged with ammonium nitrate was activated by calcining them in a muffle furnace at 1100° F. for 4 hours. The sample had a bulk density of 0.762 kg./l.

The attrition-resistance of the 200–700 mesh fraction of the calcined catalyst was measured by the following procedure.

A volume of the heat-treated catalyst (0.661 cc.) and 0.5 g. of 14/20 mesh (U.S. Standard Sieve) silica sand was placed in a 2 cc. vial of a Wig-L-Bug grinding mill and the mill was operated for 5 seconds. (The Wig-L-Bug grinding mill is a product of Spex Industries, and is described in Catalog No. 5000 of that company.) The sample was then screened and the percentage of minus 325 mesh material was reported as the percent weight loss.

The test was repeated in 5 second increments on the plus 325 mesh portions of the remainder of the sample. A plot of percent weight loss vs. time was obtained. The slope of curve at 20% loss was designated the "attrition rate."

The attrition rate for the experimental catalyst was 1.5%/sec., which rate is comparable to that of the most attrition-resistant zeolitic fluid catalyst commercially available.

EXAMPLE II

The results of the following tests demonstrate that, by controlling the duration of hydrothermal treatment, zeolite Y (high $SiO_2/Al_2O_3$ molar ratio form) may be obtained from a reaction mixture which would produce zeolite B or a mixture of zeolite B and zeolite Y if the duration of the hydrothermal treatment were not controlled. The results also illustrate that when zeolite B crystallizes it does so at the expense of previously formed zeolite Y.

In carrying out the tests, a blend of the same calcined microspheres employed in Example I was used in proportion of 7.5 g. of microspheres calcined at 1350° F. to 142.5 g. microspheres calcined at 1800° F. The mixture of microspheres were added to 220.2 ml. of the 14% sodium hydroxide solution and reacted at 100° F. for 24 hours and then crystallized at 180° F. for various periods of time. The reaction and crystallization were carried out in the same equipment and using the same techniques described in the previous example.

The zeolites present in the products after carrying the crystallization step for various periods of time at 180° F. are reported below in table form along with the percentage of any crystalline zeolite that was present. When zeolite Y was present, the $SiO_2/Al_2O_3$ mole ratio, as ascertained from the X-ray diffraction pattern, is given in the table.

Data in the table for the effect of crystallization time on the species of zeolitic molecular sieve in the product indicate that an optimum crystallization time for the particular reaction mixture employed was about 24 hours. When this crystallization period was used, the product contained almost 32% zeolite Y and it had a high $SiO_2/Al_2O_3$ mole ratio of 4.46.

The data show also that crystallization conditions were maintained for a substantially longer period of time, the quantity of zeolite Y decreased to 26% and the $SiO_2/Al_2O_3$ mole ratio of the zeolite Y also decreased. When a crystallization period of 46 hours was used, the product contained a significant quantity of zeolite B.

EFFECT OF CRYSTALLIZATION TIME ON THE SPECIES OF ZEOLITIC MOLECULAR SIEVES PRESENT

| Time at 180° F., hours | Sodium zeolite B, percent [1] | Sodium zeolite Y, percent | $SiO_2/Al_2O_3$ of zeolite Y |
|---|---|---|---|
| 2.5 | 0 | 0 | |
| 22.5 | 0 | 24.5 | 4.43 |
| 24.0 | 1 | 31.9 | 4.46 |
| 46.0 | 31.6 | 26.0 | 4.30 |

[1] Intensity of 28.2° 2θ peak ×100

Intensity of 27.1° 2θ peak for pure zeolite Y

EXAMPLE III

The following tests were carried out to illustrate the preparation of fluid catalysts, in accordance with this invention, by spray drying a slurry consisting of hydrated clay as the sole clay material, calcining portions of the microspheres at different temperatures, and reacting mixtures of the resulting calcined microspheres in aqueous sodium hydroxide solution. Critical parameters of the process are also demonstrated.

An aqueous slurry of a fine size uncalcined No. 1 paper coating grade of hydrated kaolin clay was deflocculated with tetrasodium pyrophosphate in amount of about 0.5% of the weight of the clay. The slurry was spray dried as in Example I. One portion of the microspheres was calcined in a muffle furnace at 1350° F. for 2 hours. Other portions were separately calcined in the muffle furnace at 1800° F., 1900° F. and 2000° F., each for 2 hours.

A part of microspheres calcined at 1350° F. were separately blended with microspheres calcined at 1800° F., 1900° F. and 2000° F. in proportion of 10 parts by weight to 90 parts by weight, respectively. The mixture (150 g.) was gradually charged to 220 ml. of a 14% (w./w.) solution of sodium hydroxide solution and held at 100° F.±20° F. for 20 hours while the mixture was being agitated. The procedures and equipment described in Example I were used. After 20 hours, the temperature was increased to 180° F. and agitation was continued while the temperature was maintained at 180° F. During the 180° F. treatment, small samples were periodically removed, filtered, washed, dried and analyzed.

The procedure was repeated using 150 g. of microspheres calcined at 1900° F. as the sole calcined microspheres and 220 ml. of the 14% sodium hydroxide solution to determine whether zeolite Y could be obtained without blending the metakaolin-containing microspheres with the microspheres calcined at 1900° F. The procedure was repeated with microspheres calcined at 2000° F.

An outstanding product containing 52% zeolite Y with only a trace of zeolite B was obtained after 12 hours at 180° F. from the reaction mixture including the 10/90 mixture of microspheres calcined at 1350° F. and 1900° F. When this reaction mixture was held at crystallization temperature for longer times the quantity of zeolite Y decreased and the quantity of zeolite B increased. Zeolite B was obtained from the reaction mixture in which the microspheres calcined at 1900° F. were used without incorporating microspheres calcined at 1350° F.; zeolite Y was not detectable in the X-ray pattern of the product.

With the reaction mixture including the 10/90 mixture of microspheres calcined at 1350° F. and 2000° F., respectively, somewhat less zeolite Y and slightly more zeolite B was present after 12 hours' crystallization at 180° F. Substantial proportions of zeolite B were present after 22 hours at 180° F. Zeolite B substantially free from the desired zeolite Y was obtained when the microspheres calcined at 2000° F. were reacted in the absence of microspheres containing metakaolin.

Thus, by using blends of microspheres including microspheres calcined below the characteristic kaolin exotherm and microspheres that had passed through the exotherm during calcination, the desired product including sodium zeolite Y as the principal crystalline phase was obtained. Using the microspheres individually in the same reaction system, this result could not be realized.

We claim:

1. In a method for preparing a zeolitic catalyst which comprises providing coherent spray dried anhydrous aluminum silicate microspheres (A) consisting essentially of calcined kaolin clay substantially all of which has undergone the kaolin exotherm, said microspheres (A) being free from hydrated kaolin clay, slurrying said microspheres in an aqueous solution of sodium hydroxide, subjecting the resulting slurry to hydrothermal treatment with agitation while preventing substantial change in concentration due to loss of water until synthetic sodium faujasite crystallizes, silica being extracted from the microspheres during said hydrothermal treatment, separating the crystallized microspheres from the mother liquor and ion exchanging the microspheres to reduce the sodium content thereof, the improvement which comprises incorporating into said slurry of calcined microspheres (A) and aqueous solution of sodium hydroxide, coherent spray dried aluminum silicate microspheres (B) consisting essentially of metakaolin, said microspheres (B) being free from hydrated kaolin clay and being present in amount of 1 to 50 parts by weight to 100 parts by weight of said microspheres (A), the sodium hydroxide solution having a concentration within the range of 10 percent to 22 percent and being present in amount to provide from 0.5 to 1.0 mole $Na_2O$ per mole total $Al_2O_3$ in said microspheres (A) and (B).

2. The method of claim 1 wherein said microspheres (B) are obtained by spray drying a slurry comprising water, a clay material selected from the group consisting of hydrated kaolin clay and mixtures of hydrated kaolin clay and calcined kaolin clay, and calcining the resulting microspheres at a temperature and for a time such that hydrated kaolin is converted to metakaolin.

3. The method of claim 2 wherein said slurry also contains a clay deflocculating agent.

4. The method of claim 1 wherein said microspheres (A) and (B) are obtained by calcination of the same uncalcined microspheres, said uncalcined microspheres being obtained by forming a slurry consisting essentially of water, hydrated kaolin clay and a deflocculating agent and spray drying said slurry to form microspheres, calcining a portion of said microspheres under conditions such that hydrated kaolin clay undergoes or passes through the characteristic exotherm, thereby producing microspheres (A), and calcining another portion of said microspheres at a temperature such that hydrated clay is converted to metakaolin, thereby producing microspheres (B).

5. The method of claim 4 wherein said deflocculating agent is tetrasodium pyrophosphate.

6. The method of claim 1 wherein said microspheres comprising crystalline sodium faujasite are ion-exchanged with a source of ammonium ions.

7. The method of claim 1 wherein the hydrothermal treatment is carried out in a vessel provided with means to condense water that is evaporated and to return the condensed water to the slurry.

8. The method of claim 1 wherein both said microspheres (A) and (B) have $SiO_2/Al_2O_3$ mole ratios of about 2/1.

References Cited

UNITED STATES PATENTS

| | | | |
|---|---|---|---|
| 3,406,124 | 10/1968 | Eastwood et al. | 252—455 |
| 3,433,587 | 3/1969 | Haden, Jr. et al. | 23—112 |
| 3,458,454 | 7/1969 | Lapides et al. | 252—455 |

DANIEL E. WYMAN, Primary Examiner

C. F. DEES, Assistant Examiner

U.S. Cl. X.R.

23—112

Disclaimer 3,647,718.—*Walter L. Haden, Jr.*, Metuchen, and *Frank J. Dzierzanowski*, Somerset, N.J. MICROSPHERICAL ZEOLITIC MOLECULAR SIEVE COMPOSITE CATALYST AND PREPARATION THEREOF. Patent dated Mar. 7, 1972. Disclaimer filed June 4, 1971, by the assignee, *Engelhard Minerals & Chemicals Corporation.*

Hereby disclaims the portion of the term of the patent subsequent to Apr. 14, 1987.

[*Official Gazette March 13, 1973.*]